United States Patent [19]

Young

[11] 4,099,448

[45] Jul. 11, 1978

[54] OSCILLATING ENGINE

[76] Inventor: Gerald H. Young, 2082 Gulfshore Blvd. N., Naples, Fla. 33940

[21] Appl. No.: 650,068

[22] Filed: Jan. 19, 1976

[51] Int. Cl.$^2$ .................... F02B 53/00; F02B 55/00
[52] U.S. Cl. .................................. 91/339; 92/120; 123/18 R; 417/481
[58] Field of Search .................... 123/18 R, 18 A; 417/481, 482; 91/339; 92/120

[56] References Cited

U.S. PATENT DOCUMENTS

| 710,212 | 9/1902 | Reynolds | 91/339 |
| 1,012,164 | 12/1911 | Rose | 91/339 |
| 1,042,449 | 10/1912 | Kelchner | 91/339 |
| 3,181,513 | 5/1965 | Young | 123/18 R |
| 3,388,693 | 6/1968 | James | 123/18 R |
| 3,507,119 | 4/1970 | Kayser | 123/18 R |

FOREIGN PATENT DOCUMENTS

| 579,776 | 1958 | Italy | 123/18 |

*Primary Examiner*—Wendell E. Burns
*Attorney, Agent, or Firm*—Kenyon & Kenyon, Reilly, Carr & Chapin

[57] ABSTRACT

An oscillating engine having synchronized oppositely-rotating vaned rotors in adjacent arcuate chambers. Intake and exhaust openings for each chamber are located adjacent to each other near at least one of the extreme positions of oscillation of each respective rotor. A rotary valve member positioned adjacent both to the intake opening and the exhaust opening of each chamber is actuated intermittently by a chain and sprocket drive in timed relation with the rotor oscillation between positions where the valve alternately closes each intake and exhaust opening to positions where the valve alternately partially opens each intake and exhaust opening. The rotary valve includes angled first and second camming surfaces, and a camming member resiliently biased against the valve member forms an acute angle with the first camming surface when the exhaust opening is partially open and forms an acute angle with the second camming surface when the intake opening is partially open to further rotate the valve to fully open exhaust and fully open intake positions, respectively. The design is suitable for either pressurized compressible fluid or internal combustion engine application.

10 Claims, 6 Drawing Figures

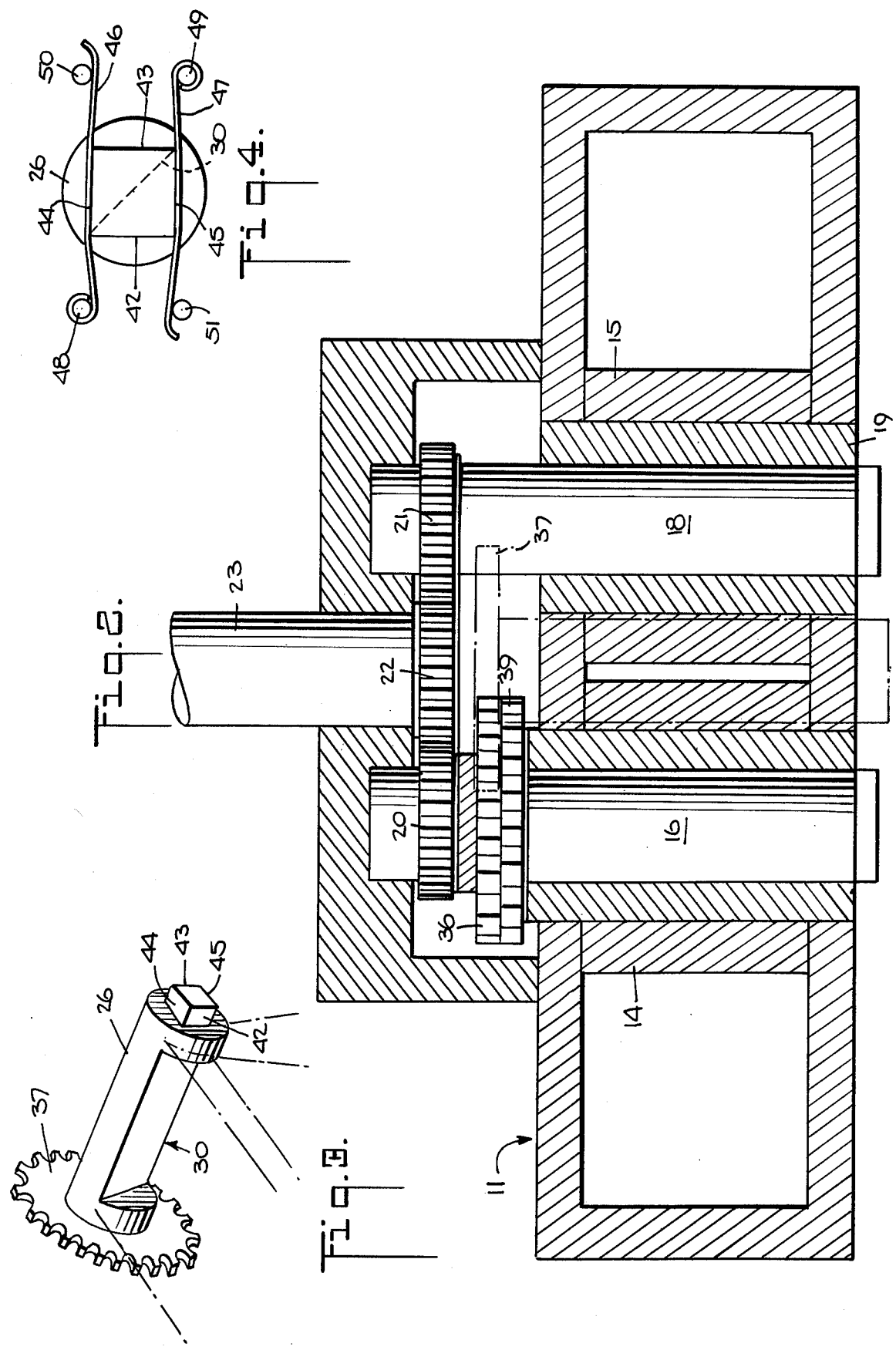

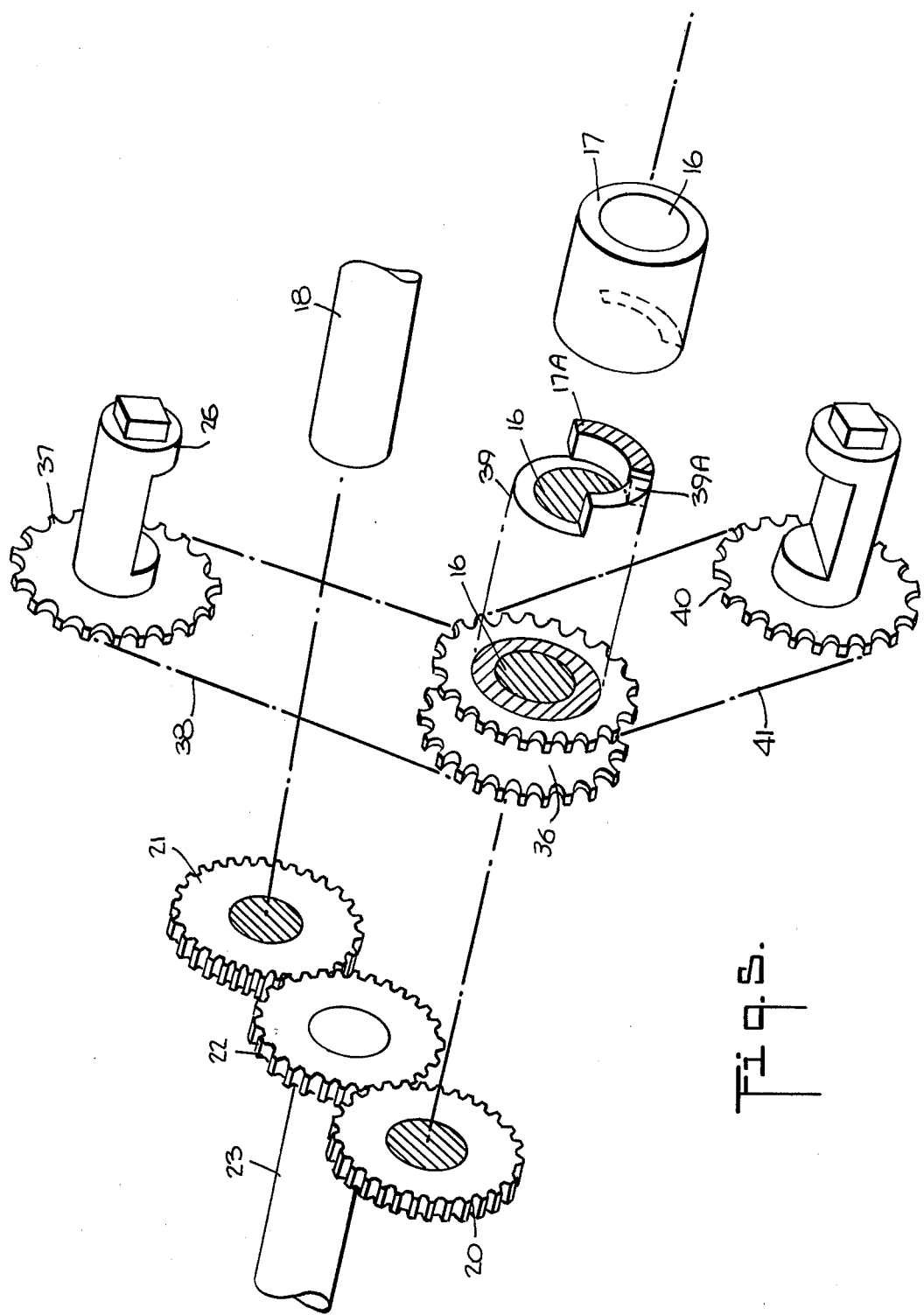

OSCILLATING ENGINE

BACKGROUND OF THE INVENTION

This invention relates to fluid power devices, and more particularly it is concerned with compressible fluid engines that operate with an oscillating rotary motion.

The fluid device of this invention is an improvement of the oscillating engine disclosed in my prior U.S. Pat. No. 3,181,513 issued on May 4, 1965, and the disclosure of that patent is expressively incorporated by reference in this specification. As fully described in my U.S. Pat. No. 3,181,513, the oscillating engine of that invention comprises a pair of adjacent arcuate chambers, in each of which a vaned rotor is mounted to move in an oscillating manner. The two rotors are synchronized through a gear train to oscillate in opposite directions, and separate valve means are provided for controlling the flow of fluid into and out of the chambers in timed relation with the oscillating motion of the rotors.

In the internal combustion engine embodiment disclosed in my U.S. Pat. No. 3,181,513, a rotary exhaust valve and a poppet-type intake valve for each chamber are actuated through pushrods by a cam on each respective rotor shaft. The exhaust and intake openings to each chamber are located in the intermediate portion of the chamber, between the extreme positions of the rotor. In particular, the exhaust opening is at approximately the midpoint of rotor oscillation, and the intake opening is adjacent to the exhaust opening but displaced toward the expansion position of the rotor in each chamber.

The engine operates on a modified two-stroke cycle, with initial compression of the combustible mixture occurring on the back side of the rotor during the power stroke and the compressed charge being introduced to the combustion chamber midway during the return stroke. The intermediate arrangement of the exhaust and intake openings has been found to provide less than optimum overall engine efficiency, and the pushrod valve actuating mechanism of the disclosed embodiment has drawbacks from the standpoints of performance and dependability. In addition, the rotary exhaust valve design of the disclosed embodiment does not include positive control for fully opening the valve but depends upon flow of the exhaust gases through the valve when it starts to open to rotate it to the fully open position.

SUMMARY OF THE INVENTION

It is an object of the present invention to provide an improved intake and exhaust arrangement for an oscillating-rotor fluid device in which intake and exhaust openings are located adjacent to at least one of the extreme positions of each oscillating rotor.

It is another object of the invention to provide an oscillating-rotor engine having rotary intake and exhaust valves.

A further object of the invention is to provide a rotary valve member for an oscillating-rotor engine that serves for both intake and exhaust of working fluid to and from each one of the chambers.

Still another object of the invention is to provide a compressible fluid engine having a pair of oscillating vaned rotors, with one rotary valve member for controlling fluid flow to one side of each rotor simultaneously and another rotary valve member for controlling fluid flow to the other side of each rotor simultaneously.

Another object of the invention is to provide an oscillating-rotor compressible fluid engine having a fluid storage region connecting one side of each rotor to the other side of each rotor, with check valves for permitting flow into and out of the storage region only from the one side to the other side of each rotor.

Another object of the invention is to provide an intermittently actuated chain and sprocket drive for rotary valve members of an oscillating rotor engine.

It is a further object of the invention to provide resiliently biased camming means for positive rotation of the valve member from a partially open to a fully open position.

An additional object of the invention is to provide an overlapping seal arrangement for a rotor vane of an oscillating rotor fluid device.

Yet another object of the invention is to provide an oscillating-rotor fluid device having helically cut shafts for improved lubricant distribution.

The above and other objects are achieved in a fluid device of the general type that includes a housing having a pair of adjacent arcuate chambers extending in substantially opposite directions with respect to one another, each of said pair of chambers having an exhaust opening; a vaned rotor mounted for oscillation within each of said chambers; means for synchronizing the rotors to oscillate in opposite angular directions with respect to one another; means for controlling the flow of a fluid into and out of each of said chambers in timed relation with the oscillation of said rotors, said flow controlling means including a rotary valve member having an exhaust passage therethrough and being disposed adjacent said exhaust opening and means operated in timed relation with the oscillation of said rotors for rotating said valve member from one position where said valve member closes said exhaust opening to another position where said valve exhaust passage partially overlies said exhaust opening.

In the improved arrangement of the present invention the exhaust opening for each of the chambers is located adjacent to one extreme position of oscillation of the respective rotor for exhausting fluid from the chamber on one side of the rotor, and an intake opening for each of said chambers is located adjacent to each exhaust opening. A rotary valve member having an intake passage therethrough is disposed adjacent intake opening, and means operated in timed relation with the oscillation of said rotors rotates the valve member from a position where said valve member closes said intake opening to another position where said valve intake passage partially overlies said intake opening.

In a preferred embodiment, the rotary valve member disposed adjacent said exhaust opening is the same as the rotary valve member disposed adjacent said intake opening, and the exhaust passage and intake passage through the valve member are connected, with a first one of said rotary valve members located adjacent to the extreme clockwise position of one of said pair of vaned rotors for controlling the flow of fluid into and out of the chamber of said one rotor and a second one of said rotary valve members located adjacent to the extreme counterclockwise position of the other of said pair of vaned rotors for controlling the flow of fluid into and out of the chamber of said other rotor.

The engine preferably further comprises an intake port adjacent to the extreme counterclockwise position of said one rotor and the extreme clockwise position of said other rotor; a passageway connecting the intake port with each chamber for introducing a fluid through the intake port to each chamber on the other side of the respective rotor; a fluid storage region having an inlet port connected with said passageway and an outlet port connected with the intake opening for each of said chambers; a first check valve in said intake port for permitting flow through the intake port only when the pressure inside the chambers on the other side of each rotor is less than the fluid pressure outside the intake port; and a second check valve in said inlet port for permitting flow through the inlet port only when the pressure in the fluid storage region is less than the fluid pressure inside the chambers on the other side of each rotor. In addition, it may also include a third check valve positioned between the outlet port and the intake opening for one of said pair of chambers and a fourth check valve positioned between the outlet port and the intake opening for the other of said pair of chambers.

The preferred means for actuating the rotary valves comprises a first drive sprocket mounted for rotation coaxially with said one of said pair of vaned rotors; a first driven sprocket mounted concentrically on the second one of said rotary valve members; a first timing chain connecting the first drive sprocket to the first driven sprocket; means for intermittently coupling the first drive sprocket to the one rotor for rotating the second one of the rotary valve members during predetermined portions of the cycle of rotor oscillation; a second drive sprocket mounted for rotation coaxially with said other of said pair of vaned rotors; a second drive sprocket mounted concentrically on the first one of said rotary valve members; a second timing chain connecting the second drive sprocket to the second driven sprocket; and means for intermittently coupling the second drive sprocket to the other rotor for rotating the first one of the rotary valve members during predetermined portions of the cycle of rotor oscillation in synchronism with the rotation of the second one of the rotary valve members.

In order to provide positive valve opening from the partially open rotary valve positions, the invention includes first and second camming surfaces on the rotary valve member, the first camming surface making a predetermined angle with the second camming surface, and a camming member mounted on the housing and resiliently biased against the rotary valve member at a predetermined angle such that when the rotary valve member is rotated to said position where said valve exhaust passage partially overlies said exhaust opening, the camming member forms an acute angle with the first camming surface for further rotating the valve member to a first stable position where said valve exhaust passage fully overlies said exhaust opening, and when the rotary valve member is rotated to said position where said valve intake passage partially overlies said intake opening, the camming member forms an acute angle with the second camming surface for further rotating the valve member to a second stable position where said valve intake passage fully overlies said intake opening.

The foregoing and other features and improvements of the present invention will be apparent from the following description of the preferred embodiments in conjunction with the accompanying drawings.

BRIEF DESCRIPTION OF THE DRAWINGS

FIG. 2 is a sectional plan view taken on line 2—2 of the embodiment of FIG. 1.

FIG. 3 is a perspective view of a rotary valve member according to the invention.

FIG. 4 is an end view of the rotary valve member of FIG. 3 showing the relation between camming surfaces and camming members when the valve is in a stable, fully open position.

FIG. 5 is an exploded perspective view of the drive shaft arrangement and valve operating mechanism of the embodiment of FIG. 1.

DESCRIPTION OF THE PREFERRED EMBODIMENTS

Figure 1:
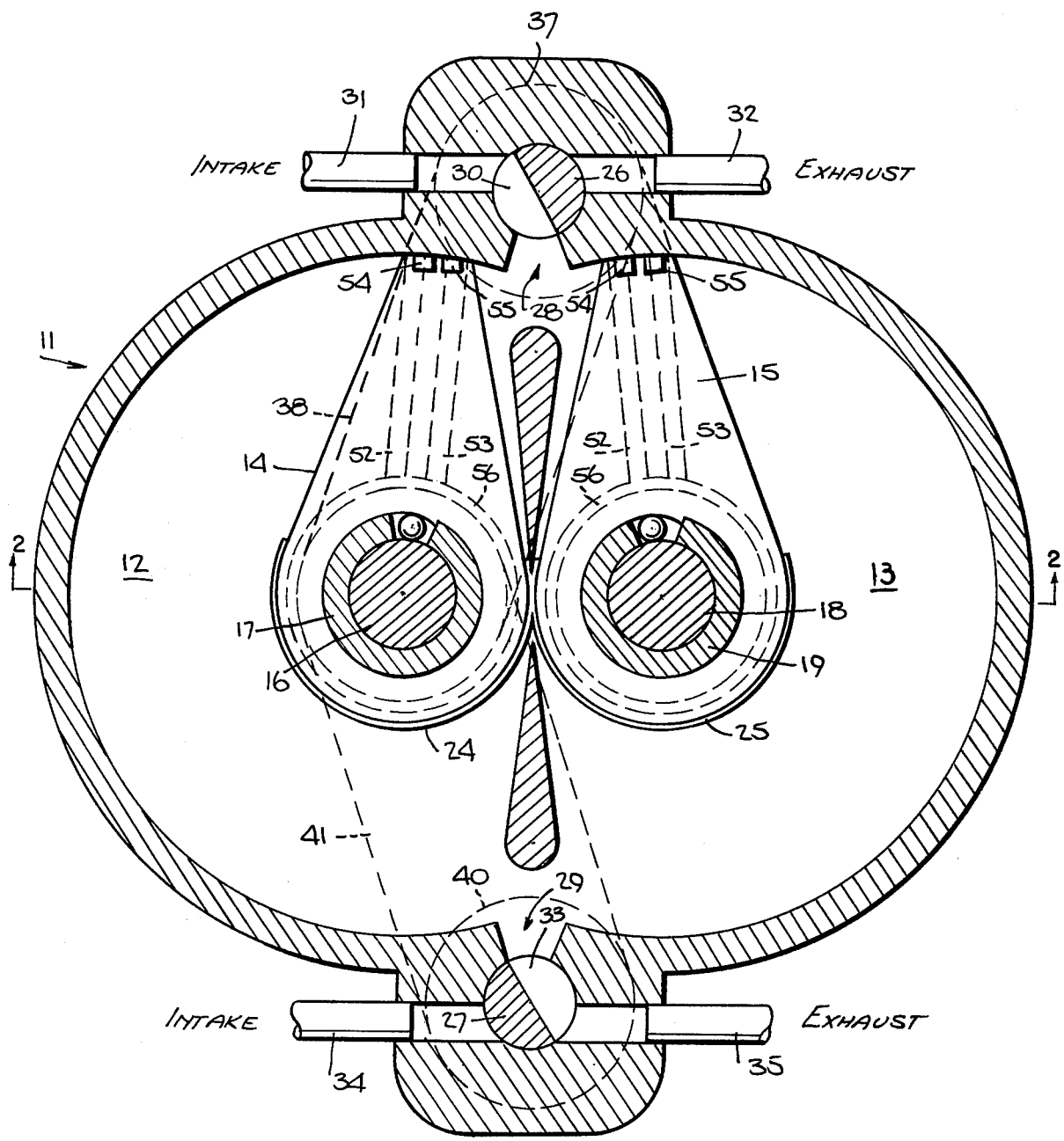
FIG. 1 is a sectional elevation view of a pressurized compressible fluid engine embodiment of the invention showing a pair of chambers containing vaned rotors that oscillate in synchronism in opposite directions.

FIGS. 1 and 2 illustrate a pressurized compressible fluid engine embodiment of the invention that is suitable for operation by steam or compressed air. The engine includes a housing 11 having a pair of arcuate chambers 12 and 13 in which are mounted vaned rotors 14 and 15, respectively. Left hand rotor 14 is mounted on a first drive shaft 16 by means of an overriding roller clutch 17 that permits clockwise rotation of rotor 14 on shaft 16 but prevents counterclockwise rotation of the rotor with respect to the shaft, as viewed in the direction of FIG. 1. Right hand rotor 15 is similarly mounted on a parallel second drive shaft 18 by means of an overriding roller clutch 19 that also permits clockwise rotation of rotor 15 on shaft 18 but prevents counterclockwise rotation of the right-hand rotor with respect to its shaft.

Thus, roller clutches 17 and 19 convert bi-directional oscillation of rotors 14 and 15 into unidirectional (counterclockwise) rotation of shafts 16 and 18, respectively. Other conventional types of unidirectional clutches may be substituted for the roller clutches shown in the drawings if preferable for particular operating conditions.

As shown in FIG. 2, the two drive shafts 16 and 18 carry identical drive gears 20 and 21, respectively, that mesh with a driven gear 22 mounted on an output shaft 23. Since both drive shafts rotate counterclockwise, as viewed from FIG. 1, the output shaft will rotate clockwise.

Rotors 14 and 15 have sectors of gear teeth 24 and 25, respectively, on the opposite side of each rotor body from the vane, and the spacing of drive shafts 16 and 18 is established to permit meshing engagement of the two gear sectors in order to synchronize the movement of the two rotors.

Between the chambers 12 and 13 at the top and bottom of the engine housing, an upper rotary valve member 26 and a lower rotary valve member 27 control the intake and exhaust of fluid from the engine. The upper valve is located adjacent to an upper opening 28 that is next to the upper extreme positions of oscillation of the rotors and leads to both chambers on one side of each rotor. The lower valve is similarly located adjacent to a lower opening 29 that is next to the lower extreme positions of oscillation of the rotors and leads to both chambers on the other side of each rotor. Valve 26 has a passage 30 for selectively connecting an upper intake conduit 31 or an upper exhaust conduit 32 to opening 28, and valve 27 has a similar passage 33 for selectively connecting a lower intake conduit 34 or a lower exhaust conduit 35 to opening 29.

Each rotary valve member is actuated by means operated in timed relation with the oscillation of the rotors to rotate the member alternately from a stable position where the valve closes its respective exhaust conduit to an unstable position where it partially uncovers the exhaust conduit and from a stable position where the valve closes its respective intake conduit to an unstable position where it partially uncovers the intake conduit. The upper valve actuating means include a first drive sprocket 36 mounted for rotation coaxially with the left rotor 14, a first driven sprocket 37 mounted concentrically on the upper valve member, and a timing chain 38 connecting sprockets 36 and 37. The lower valve actuating means includes a second drive sprocket 39 mounted coaxially with sprocket 36, a second driven sprocket 40 mounted concentrically on the lower valve member, and a second timing chain 41 connecting sprockets 39 and 40. Although drive sprockets 36 and 39 are shown as separate sprockets in the drawing, they are connected to turn together on shaft 16 and may be formed as one double-width sprocket, if desired.

As used in the specification and claims, the terms sprocket and timing chain will be considered to be generic descriptions that include gears and timing belts or other equivalent flexible connector timing drives.

The operation of the rotary valve members can best be understood from FIGS. 3-5, taken in conjunction with FIGS. 1 and 2. In the particular configuration of the engine in FIG. 1, the angle of oscillation of each rotor is approximately 190°, but the angle of valve rotation from fully open intake to fully open exhaust is about 90°, although it will be appreciated that different arrangements of intake and exhaust conduits could result in different angles of valve operation. In addition, it is desirable to be able to preselect the rotor angles at which the valves initially open the intake and exhaust conduits to communication with the chambers.

Consequently, both drive sprockets 36 and 39 are rotatable together with respect to drive shaft 16. Sprocket 39 is intermittently coupled to rotor 14 by a sector cam 39A projecting from the face of sprocket 39 that is engaged by a similar sector cam 17A projecting from the adjacent end of roller clutch 17. As described previously, clutch 17 is fixed to rotor 14 and engages shaft 16 only when the rotor is driven in the counterclockwise direction.

If we adopt the convention, in connection with FIG. 1, that the vertically upward direction is the zero degree position and that all angles are measured clockwise, then FIG. 1 illustrates initial upper extreme positions for the left and right rotors of approximately 5° and 355°, respectively. At the same time, the upper rotary valve is in a stable, fully open intake position, and the lower rotary valve is in a stable, fully open exhaust position. These stable valve positions are achieved by providing first camming surfaces 42, 43 and second camming surfaces 44, 45 on the end of upper valve member 26 and similar camming surfaces on lower valve member 27 (FIGS. 3 and 4).

When the upper valve member is in the fully open intake position shown in FIG. 1, a pair of camming members such as leaf springs 46 and 47, that are attached at one end to the engine housing by pins 48 and 49, respectively, are resiliently urged into contact with the second camming surfaces 44 and 45 by respective biasing pins 50 and 51 to hold the valve stably in that position. At the same time, the lower valve is held in a stable fully open exhaust position by similar camming members.

Assuming that the intake conduits of the engine are connected to a source of pressurized compressible fluid, such as steam, this fluid will enter both chambers through intake port 31, passage 30 of upper valve 26, and opening 28, thereby forcing rotor 14 to rotate counterclockwise and rotor 15 to rotate clockwise. As rotor 14 starts to rotate counterclockwise, roller clutch 17 grips shaft 16, driving it also counterclockwise. At the same time, clutch 19 disengages from shaft 18 to allow the shaft to be turned counterclockwise through gear train 20, 22, and 21, while rotor 15 is driven clockwise by the steam pressure. The torque developed by rotor 15 is transmitted to rotor 14 through the meshing sector gears 24, 25; so that all power developed on the downward stroke is transmitted through clutch 17 and drive shaft 16 to the output shaft 23.

As the rotors move downward, rotor 14 remains uncoupled from both drive sprockets 36 and 39 until rotor 14 reaches approximately 220°. At that point, the counterclockwise end of sector cam 17A will engage the clockwise end of sector cam 39A, causing drive sprockets 36 and 39 to rotate counterclockwise is synchronism with the rotor as it continues its counterclockwise movement. This, in turn, causes valve camming surfaces 44, 45 to rotate out of contact with camming members 46, 47 until at a rotor 14 position of approximately 175°, the camming members make equal angles with the respective first and second camming surfaces.

At this point the rotary valve members are in unstable equilibrium. As rotor 14 rotates further counterclockwise, the camming members make smaller acute angles with the second camming surfaces than with the first camming surface, and at the same time valve passage 30 partially overlies exhaust conduit 32, while valve passage 33 partially overlies intake conduit 34. Then the torque created by the force of the camming members, augmented by the respective outflow and inrush of fluid through the upper and lower valves, causes the upper valve to rotate to its stable fully open exhaust position and the lower valve to rotate to its stable fully open intake position.

Working fluid is then admitted through the lower valve to the other sides of the rotors, causing them to reverse direction and move upward. During this return stroke, clutch 19 grips drive shaft 18, while clutch 17 is disengaged from shaft 16. Thus, during the return stroke, the power developed by both rotors is transmitted through clutch 19 and drive shaft 18 to the output shaft.

Meanwhile, sector cam 17A, which became disengaged from sector 39A when the camming members rotated the valves to their other stable positions, remains disengaged until rotor 14 reaches approximately the 320° position. At that point, the clockwise end of cam 17A engages the counterclockwise end of cam 39A (as shown in FIG. 5) and begins to turn the drive sprockets and their respective rotary valves clockwise past the unstable equilibrium point (at about 5°) until they snap back to their initial positions. The cycle then repeats.

In order for the sector cams to be disengaged during 145° of rotor 14 movement (i.e. from 5° counterclockwise to 220° and from 175° clockwise to 320°), plus an additional 45° of independent valve movement under the influence of the camming members, there must be a total of 190° cut away, leaving 170° to be divided between the two sector cams. Since the two sector cams should be approximately equal in size, to equalize their strength, each will include an angle of about 85° or, for simplicity of manufacture, one cam can be cut to exactly 90°, and the other will then include the remaining 80°. Of course, different engine designs will call for different valve actuating positions; the above numbers are only by way of example.

From the foregoing description, it is apparent that the engine embodiment of FIGS. 1 - 5 provides simple and positive valving action for a pressurized fluid engine having a pair of oscillating rotors that both produce a power stroke for each half of the cycle of oscillation.

In addition, the engine of the present invention includes forced oil control by means of helically cut drive shafts 16 and 18. Oil borings (not shown) maintain constant lubrication by the forcing action of the helically cut drive shafts in combination with centrifugal force. At the same time, effective oil sealing is provided by two outwardly extending oil seals in the form of wiping bars 52, 53 in each end face of each rotor vane and by two oil seals in the form of wiping bars 54 and 55 extending longitudinally on the outer edge of each rotor vane. Particularly effective sealing is obtained by overlapping the outer ends of wiping bars 52, 53 with the ends of the wiping bars 54, 55 to provide positive sealing at the outer corners of each rotor vane. A circular oil seal ring 56 provides a seal between the inner ends of wiping bars 52, 53 and the engine drive shafts.

Figure 6:
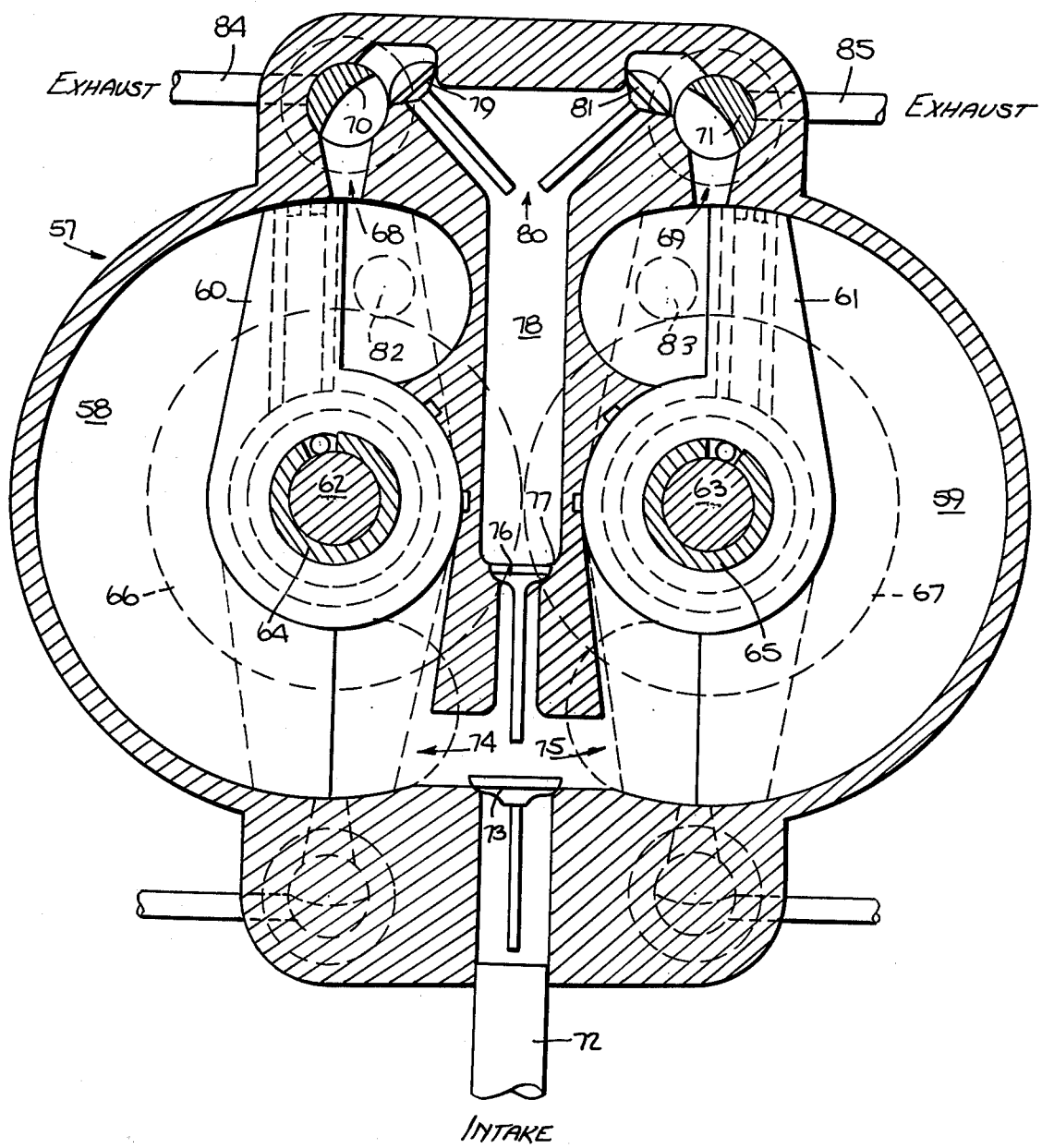
FIG. 6 is a sectional end view of an internal combustion engine embodiment of the invention.

As shown in FIG. 6, the improvements of the present invention are also adaptable to a two-stroke cycle internal combustion engine embodiment. In this second embodiment the engine includes a housing 57 also having at least one pair of arcuate chambers 58 and 59 in which are mounted vaned rotors 60 and 61, respectively. The rotors are mounted on left and right drive shafts 62 and 63 by means of roller clutches 64 and 65 in exactly the same manner as in the previous embodiment. The drive shafts are coupled to each other and to a single output shaft in the manner shown in FIG. 2, but the rotors are coupled to each other through separate gears 66 and 67 in the manner disclosed in my U.S. Pat. No. 3,181,513 instead of through sector gears incorporated in the body of each rotor as in FIG. 1.

In this internal combustion engine embodiment, chambers 58 and 59 have single openings 68 and 69 located adjacent to the extreme upward position of oscillation of rotors 60 and 61 for introducing and exhausting a combustible mixture through rotary valve members 70 and 71, respectively. The combustible mixture is supplied from a source such as a conventional carburetor (not shown) through an intake circuit 72 and a first poppet-type check valve 73 to chambers 58 and 59 through passageways 74 and 75 adjacent to the lower extreme positions of oscillation of rotors 60 and 61, respectively, whenever the pressure in the chambers on the back sides of the rotors is less than the pressure in the intake conduit. This occurs during the upstroke portion of the rotor cycle (i.e. when rotor 60 rotates clockwise and rotor 61 rotates counterclockwise).

When the rotors reach the upper extreme position of their cycle of oscillation, as shown in FIG. 6, and begin their downward stroke, the combustible mixture that had been admitted to the chambers on the upward stroke is compressed, thereby causing the first check valve 73 to close and a second check valve 76, located in an inlet port 77 of a fluid storage region 78, to open. The open second check valve admits the compressed combustible mixture to the fluid storage region as the rotors continue their downward stroke and then closes when they reverse, and the cycle repeats.

The rotary valve members 70 and 71 are actuated by chain and sprocket timing means (not shown) similar to that illustrated and described in relation to the preceding embodiment, except that rotary valve 70 is operated by a drive sprocket rotatably mounted on shaft 63 and intermittently coupled to rotor 61, while rotary valve 71 is operated by a drive sprocket rotatably mounted on shaft 62 and intermittently coupled to rotor 60, in each case through camming means similar to that described for the previous embodiment.

Thus, as rotors 60 and 61 complete their upward strokes (moving clockwise and counterclockwise, respectively), rotary valves 70 and 71 are turned from first stable fully open exhaust positions through a point of unstable equilibrium to a partially open intake position by the timing chain and sprocket mechanism. The valves then automatically rotate to their fully open intake positions under the influence of camming members acting on camming surfaces in the manner described previously in connection with FIGS. 3 and 4. This valve state occurs as the rotors reach their zero degree positions depicted in FIG. 6.

At that point, the pressure of the combustible mixture in fluid storage region 78 is higher than the pressure in the top portions of the chambers, causing a third check valve 79, positioned between an outlet port 80 of the fluid storage region and the left hand rotary valve 70, and a fourth check valve 81, positioned between outlet port 80 and right hand rotary valve 71, to open and pass the combustible mixture through openings 68 and 69 into the chambers on the face, or combustion, sides of the rotors.

At a suitable time following the admission of the previously compressed combustible mixture into the upper part of the chambers, the mixture in each chamber is ignited by spark plugs 82 and 83. The increased pressure of the burning mixture causes check valves 79 and 81 to shut and then drives the rotors downward on their power strokes. As rotors 60 and 61 complete their counterclockwise and clockwise rotations, they engage their respective drive sprockets and thereby turn the rotary valve members from the stable open intake positions through the point of unstable equilibrium to partially open exhaust positions when the rotors reach their extreme downward positions of oscillation. The camming members then force the valves into their fully open exhaust positions, allowing the combusted gases to escape into exhaust passageways 84, 85 as the rotors reverse direction and return to their initial positions.

Since the two-stroke internal combustion cycle of the engine embodiment of FIG. 6 produces a power stroke only during one half of the cycle for each pair of chambers, a preferred arrangement is to have an additional pair of chambers identical, but inverted in relation, to the first pair, as described in my U.S. Pat. No. 3,181,513. The location of the rotary valves for such additional chambers is indicated by dashed lines in the lower portion of housing 57.

The rotors in the second pair of chambers should be aligned with the coaxially mounted rotors in the first pair of chambers so that their power strokes will occur during the exhaust strokes of the first pair of rotors. In this way, there will be a power stroke in alternate pairs of chambers for each successive half-cycle of rotor oscillation.

The details of ignition timing and engine starting are all fully covered in the specification of my U.S. Pat. No. 3,181,513 and need not be repeated here. Valve timing for the second pair of chambers can be accomplished by using the same drive sprockets and timing chains as for the first pair of chambers, with the left hand valves of each pair being driven by the sprocket on the right hand drive shaft and the right hand valves being driven by the sprocket on the left hand drive shaft.

I claim:

1. A fluid device of the type that includes a housing having a pair of adjacent arcuate chambers extending in substantially opposite directions with respect to one another, each of said pair of chambers having an exhaust opening; a vaned rotor mounted for oscillation within each of said chambers; means for synchronizing the rotors to oscillate in opposite angular directions with respect to one another; means for controlling the flow of a fluid into and out of each of said chambers in timed relation with the oscillation of said rotors, said flow controlling means including a rotary valve member having an exhaust passage therethrough and being disposed adjacent said exhaust opening and means operated in timed relation with the oscillation of said rotors for rotating said valve member from one position where said valve member closes said exhaust opening to another position where said valve exhaust passage partially overlies said exhaust opening, wherein the improvement comprises:

said exhaust opening for each of said chambers being located adjacent to one extreme position of oscillation of the respective rotor for exhausting fluid from the chamber on one side of the rotor and an intake opening for each of said chambers being located adjacent to said exhaust opening;

said means for controlling the flow of fluid into and out of said chambers comprising a rotary valve member having an intake passage therethrough and being disposed adjacent said intake opening and means operated in timed relation with the oscillation of said rotors for rotating said valve member from a position where said valve member closes said intake opening to another position where said valve intake passage partially overlies said intake opening, said rotary valve member disposed adjacent said exhaust opening being the same as the rotary valve member disposed adjacent said intake opening; and a first one of said rotary valve members being located adjacent to the extreme clockwise position of one of said pair of vaned rotors for controlling the flow of fluid into and out of the chamber of said one rotor and a second one of said rotary valve members being located adjacent to the extreme counterclockwise position of the other said pair of vaned rotors for controlling the flow of fluid into and out of the chamber of said other rotor.

2. The fluid device of claim 1 comprising:

an intake port adjacent to the extreme counterclockwise position of said one rotor and the extreme clockwise position of said other rotor;

a passageway connecting the intake port with each chamber for introducing a fluid through the intake port to each chamber on the other side of the respective rotor;

a fluid storage region having an inlet port connected with said passageway and an outlet port connected with the intake opening for each of said chambers;

a first check valve in said intake port for permitting flow through the intake port only when the pressure inside the chamber on the other side of each rotor is less than the fluid pressure outside the intake port; and a second check valve in said inlet port for permitting flow through the inlet port only when the pressure in the fluid storage region is less than the fluid pressure inside the chambers on the other side of each rotor.

3. The fluid device of claim 2 comprising additional check valve means between the outlet port of the fluid storage region and the intake opening for each of said chambers for permitting flow only when the pressure on the intake opening side of the valve is less than the pressure in the fluid storage region.

4. The fluid device of claim 2 wherein the additional check valve means comprises:

a third check valve positioned between the outlet port and the intake opening for one of said pair of chambers and a fourth check valve positioned between the outlet port and the intake opening for the other of said pair of chambers.

5. The fluid device of claim 1 comprising:

a first drive sprocket mounted for rotation coaxially with said one of said pair of vaned rotors;

a first driven sprocket mounted concentrically on the second one of said rotary valve members;

a first timing chain connecting the first drive sprocket to the first driven sprocket;

means for intermittently coupling the first drive sprocket to the one rotor for rotating the second one of the rotary valve members during predetermined portions of the cycle of rotor oscillation;

a second drive sprocket mounted for rotation coaxially with said one of said pair of vaned rotors;

a second driven sprocket mounted concentrically on the first one of said rotary valve members;

a second timing chain connecting the second drive sprocket to the second driven sprocket; and means for intermittently coupling the second drive sprocket to the other rotor for rotating the first one of the rotary valve members during predetermined portions of the cycle of rotor oscillator in synchronism with the rotation of the second one of the rotary valve members.

6. A fluid device of the type that includes a housing having a pair of adjacent arcuate chambers extending in substantially opposite directions with respect to one another, each of said pair of chambers having an exhaust opening; a vaned rotor mounted for oscillation within each of said chambers; means for synchronizing the rotors to oscillate in opposite angular directions with respect to one another; means for controlling the flow of a fluid into and out of each of said chambers in timed relation with the oscillation of said rotors, said flow controlling means including a rotary valve member having an exhaust passage therethrough and being disposed adjacent said exhaust opening and means operated in timed relation with the oscillation of said rotors for rotating said valve member from one position where said valve member closes said exhaust opening to another position where said valve exhaust passage partially overlies said exhaust opening, wherein the improvement comprises:

said exhaust opening for each of said chambers being located adjacent to one extreme position of oscillation of the respective rotor for exhausting fluid from the chamber on one side of the rotor and an intake opening for each of said chambers being located adjacent to said exhaust opening;

said means for controlling the flow of fluid into and out of said chambers comprising a rotary valve member having an intake passage therethrough and being disposed adjacent said intake opening and means operated in timed relation with the oscillation of said rotors for rotating said valve member from a position where said valve member closes said intake opening to another position where said valve intake passage partially overlies said intake opening, said rotary valve member disposed adjacent said exhaust opening being the same as the rotary valve member disposed adjacent said intake opening;

a drive sprocket mounted for rotation on an axis parallel to the axis of one of said vaned rotors;

a driven sprocket mounted concentrically on the rotary valve member;

a timing chain connecting the drive sprocket with the driven sprocket; and means for intermittently coupling the drive sprocket to the one rotor for rotating the rotary valve member during predetermined portions of the cycle of rotor oscillation.

7. The fluid device of claim 6 wherein the drive sprocket axis is coaxial with the axis of said one vaned rotor, and the means for intermittently coupling the drive sprocket to the one rotor for rotating the rotary valve member during predetermined portions of the cycle of rotor oscillation comprises a sector cam extending from an end of said one rotor that faces the drive sprocket and another sector cam extending from the opposing face of the sprocket into the plane of rotation of the first sector cam for engagement by the first sector cam during said predetermined portions of rotor oscillation.

8. The fluid device of claim 7 wherein said sector cams subtend approximately equal arcs.

9. A fluid device of the type that includes a housing having a pair of adjacent arcuate chambers extending in substantially opposite directions with respect to one another, each of said pair of chambers having an exhaust opening; a vaned rotor mounted for oscillation within each of said chambers; means for synchronizing the rotors to oscillate in opposite angular directions with respect to one another; means for controlling the flow of a fluid into and out of each of said chambers in timed relation with the oscillation of said rotors, said flow controlling means including a rotary valve member having an exhaust passage therethrough and being disposed adjacent said exhaust opening and means operated in timed relation with the oscillation of said rotors for rotating said valve member from one position where said valve member closes said exhaust opening to another position where said valve exhaust passage partially overlies said exhaust opening, wherein the improvement comprises:

said exhaust opening for each of said chambers being located adjacent to one extreme position of oscillation of the respective rotor for exhausting fluid from the chamber on one side of the rotor and an intake opening for each of said chambers being located adjacent to said exhaust opening;

said means for controlling the flow of fluid into and out of said chambers comprising a rotary valve member having an intake passage therethrough and being disposed adjacent said intake opening and means operated in timed relation with the oscillation of said rotors for rotating said valve member from a position where said valve member closes said intake opening to another position where said valve intake passage partially overlies said intake opening, said rotary valve member disposed adjacent said exhaust opening being the same as the rotary valve member disposed adjacent said intake opening;

first and second camming surfaces on the rotary valve member, the first camming surface making a predetermined angle with the second camming surface, and a camming member mounted on the housing and resiliently biased against the rotary valve member at a predetermined angle such that when the rotary valve member is rotated to said position where said valve exhaust passage partially overlies said exhaust opening, the camming member forms a predetermined acute angle with the first camming surface for further rotating the valve member to a first stable position when said valve exhaust passage fully overlies said exhaust opening, and when the rotary valve member is rotated to said position where said valve intake passage partially overlies said intake opening, the camming member forms a predetermined acute angle with the second camming surface for further rotating the valve member to a second stable position where said valve intake passage fully overlies said intake opening.

10. A fluid device of the type that includes a housing having a pair of adjacent arcuate chambers extending in substantially opposite directions with respect to one another, each of said pair of chambers having an exhaust opening; a vaned rotor mounted for oscillation within each of said chambers; means for synchronizing the rotors to oscillate in opposite angular directions with respect to one another; means for controlling the flow of a fluid into and out of each of said chambers in timed relation with the oscillation of said rotors; said flow controlling means including a rotary valve member having an exhaust passage therethrough and being disposed adjacent said exhaust opening and means operated in timed relation with the oscillation of said rotors for rotating said valve member from one position where said valve member closes said exhaust opening to another position where said valve exhaust passage partially overlies said exhaust opening, wherein the improvement comprises:

said exhaust opening for each of said chambers being located adjacent to one extreme position of oscillation of the respective rotor for exhausting fluid from the chamber on one side of the rotor and an intake opening for each of said chambers being located adjacent to said exhaust opening;

said means for controlling the flow of fluid into and out of each of said chambers in timed relation with the oscillation of said rotors comprising a cam connected to one of said rotors and another cam engageable with the rotor cam for preselected portions of the rotor cycles of oscillation, said other cam being coupled to said rotary valve member; and said rotor cam comprising a sector cam extending from one end of said rotor and said other cam comprising another sector cam mounted for rotation coaxially with the rotor cam and positioned in the same plane of rotation as said rotor cam.

* * * * *

UNITED STATES PATENT AND TRADEMARK OFFICE
CERTIFICATE OF CORRECTION

PATENT NO. : 4,099,448
DATED : July 11, 1978
INVENTOR(S) : Gerald H. Young

It is certified that error appears in the above-identified patent and that said Letters Patent are hereby corrected as shown below:

Column 1, line 12, delete "expressively" and insert --expressly--

Column 3, line 33, delete "drive" and insert --driven--
Column 5, line 13, delete "include" and insert --includes--
Column 6, line 27, delete "is" and insert --in--
Column 7, line 55, delete "circuit" and insert --conduit--
Column 13, line 1, delete "cycles" and insert --cycle--
Column 10, line 50, delete "oscillator" and insert --oscillation--
Column 10, line 8, delete "chamber" and insert --chambers--

Signed and Sealed this

Twentieth Day of February 1979

[SEAL]

Attest:

RUTH C. MASON
Attesting Officer

DONALD W. BANNER
Commissioner of Patents and Trademarks